United States Patent Office 3,162,644
Patented Dec. 22, 1964

3,162,644
N-ALKYL-2-BENZOXAZOLYL UREA COMPOUNDS
Alfred Englisch, Opladen-Lutzenkirchen, Konrad Koch, Dusseldorf-Benrath, Rolf Zimmermann, Wiesbaden-Biebrich, and Mario Reiser, Wiesbaden, Germany, assignors to Chemische Werke Albert, Wiesbaden-Biebrich, Germany, a corporation of Germany
No Drawing. Filed July 11, 1962, Ser. No. 209,213
Claims priority, application Germany, July 14, 1961,
C 24,612
3 Claims. (Cl. 260—307)

This invention relates to new benzoxazole derivatives and a process for their manufacture. The invention also relates to new compounds obtainable by this process.

We have found that benzoxazole derivatives of the formula

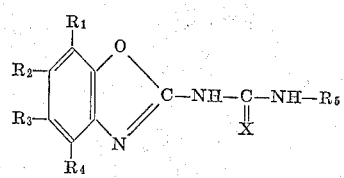

may be prepared in good yields by reacting benzoxazoles of the formula

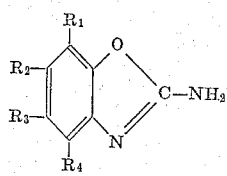

with compounds of the formula $R_5$—NCX. In these formulae the symbols $R_1$, $R_2$, $R_3$ and $R_4$ represent hydrogen or an alkyl radical—preferably a lower radical of up to 4 carbon atoms—or an alkoxy radical or a halogen, while $R_5$ represents a hydrocarbon radical or a radical containing at least one hetero atom. The hydrocarbon radical of $R_5$ may be cyclic or acyclic, straight-chained or branched, and has up to 18 carbon atoms. X may be oxygen or sulfur.

According to the invention the afore-said reactants are reacted at ordinary or elevated temperature, if desired in the presence of an inert solvent. Though higher temperatures may be applied, the reaction temperature is generally not higher than 110° C. However, when X stands for sulfur the application of higher temperatures, e.g. up to 150° C. may be suitable.

If the reaction is carried out in the presence of solvents, in most cases the reaction products are separated upon cooling in a convenient pure form. The compounds thus prepared or prepared in the absence of solvents may be further purified by recrystallisation.

The radicals $R_1$, $R_2$, $R_3$, and $R_4$ may be equal or different. They may be saturated or olefinically unsaturated, straight-chained, branched or cycloaliphatic hydrocarbon radicals such as methyl, ethyl, propyl, isopropyl, butyl, isobutyl, tert.-butyl, amyl, hexyl, cyclohexyl, methylcyclohexyl, hexahydrocymyl, octyl, diisobutyl, ethylhexyl, decyl or dodecyl radicals or the corresponding unsaturated radicals containing one or more olefinic bonds, such as the allyl radical; $R_1$, $R_2$, $R_3$ and $R_4$ may also represent alkoxy radicals such as the methoxy, ethoxy, propoxy, butoxy or isobutoxy radicals, or halogen such as chlorine, bromine or fluorine. Where two of the radicals $R_1$, $R_2$, $R_3$ or $R_4$ are adjacent to each other suitably only one may be a cyclic radical. Suitably the radicals $R_1$ to $R_4$ contain altogether not more than 18, preferably not more than 6 carbon atoms.

$R_5$ may have the same meaning as indicated for the radicals $R_1$ to $R_4$, but may also be an aromatic hydrocarbon radical or a radical containing one or more hetero atoms. Thus $R_5$ may stand for the phenyl, tolyl, benzyl, xylyl, cumyl or cymyl, ethyl-, diethyl-, propyl-, diisopropyl-, allyl-, butyl-, tert.-butl-phenyl radicals, or for the diphenyl or naphthyl radical phenyl or substituted phenyl radicals which contain one or more halogen atoms such as chlorine, bromine and/or fluorine, or for the furfuryl, pyridyl, piperidyl radicals or for the methoxy-, ethoxy- or phenoxy-ethyl, -propyl, -butyl or -phenyl radicals.

A preferred group of compounds are those in which $R_5$ represents an alkyl group of 1 to 4 carbon atoms and especially is methyl or ethyl. In a preferred subgroup of these compounds X stands for oxygen while radicals $R_1$ to $R_4$ stands for hydrogen or wherein either $R_1$ stands for a methyl or ethyl group or wherein $R_2$ or $R_3$ stand for a chlorine atom. In another preferred group of compounds $R_3$ stands for methyl or ethyl, $R_1$, $R_2$ and $R_4$ for hydrogen, $R_5$ for an alkyl radical of up to 4 carbon atoms and X for sulfur.

Suitable solvents which may be used in the process of the invention are e.g. hydrocarbons such as benzene, toluene, the various xylenes, ethylbenzene, cumene, cymene, tert.-butyl benzene or hydrocarbons either of natural or synthetic origin, boiling in the range from 60 to 260° C. such as hexane, heptane, octane, decane, dodecane or tertadecane, or mixtures containing such hydrocarbons. Other suitable solvents are ethers such as tetrahydrofuran, diphenylether or halogenated hydrocarbons such as methylene chloride, chloroform, carbon tetrachloride, tetrachloroethane, chlorobenzene or dichlorobenzene.

Since the present invention may also be carried out under elevated pressure, it is immaterial that some of the aforementioned solvents have a boiling point below 100° C. Suitably the reaction is carried out in a dry atmosphere and while excluding moisture.

The new benzoxazole derivatives obtained according to the invention are suitable as plant growth regulators and especially the above-mentioned specific groups have proved in extended animal experiments to cause a distinct relaxation of the muscles, which generally is superior to that of the known 2-amino-5-chlorobenzoxazole. Therefore they may be used in plant treating and pharmaceutical compositions together with the compounds conventionally used therein such as solvents diluents, carriers and so on.

In the following examples the relation between parts by weight and parts by volume is the same as that between kilograms and liters; parts are by weight unless otherwise indicated.

Example 1

8 parts of 2-aminobenzoxazole are suspended in 30 parts by volume of toluene and 4.25 parts of ethylisocyanate are then added dropwise. The reaction which starts while slightly evolving heat is completed by heating for 2 hours to 90 to 100° C. Upon cooling fine needles of N-ethyl-N'-2-benzoxazolyl-urea are separated. The yield is 9.7 parts and the substance melts at 164° C.

Example 2

In a closed vessel a mixture of 2 parts of 2-amino-5-methyl-benzoxazole, 1.17 parts by volume of ethyl-thioisocyanate and 15 parts by volume of toluene is heated for 4 hours to 120° C. The obtained product is either recrystallized from a mixture of equal parts of carbon tetrachloride and a mixture of hydrocarbons boiling between 60 and 120° C. or is dissolved in acetone and precipitate with water. The yield is 1.4 parts (44% of the theoretical yield) of N-ethyl-N'-5-methyl-benzoxazolyl-thiourea and the substance melts at 139–140° C.

Example 3

11 parts of 2-amino-benzoxazole are suspended in 40 parts by volume of toluene and while stirring 5 parts of methylisocyanate are added to this suspension. After 30 minutes the temperature is raised for 2 hours to 60 to 70° C. After cooling the resulting crude product is recrystallized from toluene, suitably under the addition of active carbon. The yield is 6.3 parts (39.9% of the theoretical yield) of N-methyl-N'-benzoxazolyl-urea and the substance melts at 176–177° C.

Example 4

A mixture of 1.4 parts of 2-amino-7-methyl-benzoxazole, 1.88 parts of p-bromophenylisocyanate and 30 parts by volume of toluene is reacted for 1½ hours at 110° C. Then the toluene is evaporated in vacuo and the residue is recrystallized from toluene. The yield is 2.43 parts (74.5% of the theoretical yield) of N-p-bromophenyl-N'-7-methylbenzoxazolyl-urea and the substance melts at 258° C. (from ethyl acetate).

Example 5

1.5 parts of 2-amino-5-methyl-benzoxazole are suspended in 40 parts by volume of benzene and 1.22 parts by volume of phenylisocyanate are added dropwise. After no more heat is evolved the mixture is heated under reflux for another hour. Upon cooling N-phenyl-N'-2-(5-methyl-benzoxazolyl)-urea is separated. The yield is 2.6 parts and the substance melts at 193° C.

Example 6

In a closed vessel 1.5 parts of 2-amino-5-methyl-benzoxazole, 1.7 parts of p-chloro-phenyl-isothiocyanate and 20 parts by volume of toluene are heated for 5 hours to 110° C. After cooling the solvent is distilled off in vacuo and the residue is recrystallized from isopropanol. The yield is 0.8 part of N-(p-chlorophenyl)-N'-2-(5-methyl-benzoxazolyl)-thiourea and the substance melts at 191° C.

Example 7

1.5 parts of 2-amino-7-methyl-benzoxazole are suspended in 20 parts by volume of toluene and 1.35 parts of m-tolylisocyanate, dissolved in 10 parts by volume of toluene, are then added dropwise thereto. The reaction is finished by a short warming to 80° C. Upon cooling crystalline N-m-tolyl-N'-2-(7-methyl-benzoxazolyl)-urea is separated. The yield is 2.2 parts and the substance melts at 216° C.

Example 8

2 parts of 2-amino-5-chloro-benzoxazole are suspended in 10 parts by volume of toluene and 0.85 part of ethyl-isocyanate is added dropwise while thoroughly stirring. Then the reaction mixture is stirred for further 2 hours, evaporated in vacuo and the residue is recrystallized from isopropanol. The yield is 1.2 parts of N-ethyl-N'-2-(5-chloro-benzoxazolyl)-urea and the substance melts at 206° C.

Example 9

1.2 parts of 2-amino-6-chloro-benzoxazole are suspended in 20 parts by volume of benzene, and 0.51 part of ethylisocyanate are added thereto. The mixture is then heated in a reflux condenser for 2 hours. After cooling the liquid is filtered off from the undissolved substances and the residue is recrystallized from ethanol. The yield is 1.2 parts of N-ethyl-N'-2-(6-chloro-benzoxazolyl)-urea and the substance melts at 191° C.

Example 10

1.5 parts of 2-amino-7-methyl-benzoxazole are suspended in 30 parts by volume of toluene and a suspension of 1.22 parts by volume of phenylisocyanate in 10 parts by volume of toluene is added dropwise thereto during a short time. The mixture is then heated for 1½ hours to 100–110° C. Then the toluene is evaporated in vacuo and the residue is recrystallized for several times from ethanol. The yield is 2.06 parts of N-phenyl-N'-7-methyl-benzoxazolyl-urea and the substance melts at 210–210.5° C. (74% of the theoretical yield).

Example 11

In a closed vessel, 4 parts of 2-amino-benzoxazole, 3 parts of allyl-isothiocyanate and 20 parts by volume of toluene are reacted within 5½ hours at 120–130° C. After distilling off the solvent (in vacuo), the residue is cooled in a mixture of ice and common salt and then dried on plates of baked clay. After recrystallisation from a mixture of equal parts of isopropanol and ethanol N-allyl-N'-2-benzoxazolyl-thiourea of the melting point 181° C. are obtained in a yield of 4 parts.

Example 12

In a closed vessel 3 parts of 2-amino-benzoxazole are heated for 5 hours with 2.57 parts of n-butyl-isothiocyanate and with 20 parts by volume of toluene at 120° C. After cooling the reaction mixture is concentrated in vacuo and the residue is recrystallized from methanol. There is obtained 0.9 part of n-butyl-N'-2-benzoxazolyl-thiourea having a melting point of 126° C.

Example 13

1.3 parts of 2-amino-6-methyl-benzoxazole are suspended in 20 parts by volume of toluene and 1.1 parts of cyclohexylisocyanate are then added dropwise. Then the mixture is heated for 2 hours to 100° C. Upon cooling N-cyclohexyl-N'-2-(6-methyl-benzoxazolyl)-urea is separated. The yield is 1.9 parts and the substance melts at 196° C.

Example 14

1.5 parts of 2-amino-6-methyl-benzoxazole are heated for 3 hours by 110° C. with 2.1 parts of 2-diphenylisocyanate and 25 parts by volume of toluene. After evaporation of the solvent the residue is recrystallized from isopropanol. The yield is 2.3 parts of N-diphenyl-N'-2-(6-methyl-benzoxazolyl-urea and the substance melts at 205° C.

Example 15

In a closed vessel 6.2 parts of 2-amino-benzoxazole, 6 parts of 3-methoxy-n-propyl-isothiocyanate and 30 parts by volume of toluene are heated for 5½ hours to 120–130° C. After cooling the solvent is distilled off in vacuo and the residue is recrystallized from a mixture of one part of isopropanol and two parts of a cut of hydrocarbons boiling in the range from 60 to 120° C. The yield is 6 parts of N-(3-methoxypropyl)-N'-2-benzoxazolyy-thiourea of the boiling point 123 to 125° C.

Example 16

In closed vessel, 4 parts of 2-amino-benzoxazole, 4.47 parts of benzyl-thioisocyanate and 20 parts by volume of toluene are heated for 5 hours to 120° C. After distilling off the toluene and recrystillisation from ethanol, while using some active carbon, 3.3 parts (39% of the theoretical yield) of N-benzyl-N'-benzoxazolyl-thiourea are obtained in the form of white needles which melts at 179–180° C.

Example 17

3.8 parts of 2-amino-benzoxazole are suspended in 20 parts by volume of toluene and a solution of 4.7 parts of o-ethoxyphenylisocyanate in 10 parts by volume of toluene is then added dropwise. Then the mixture is heated under reflux for 2 hours. The yield is 6.5 parts of N-o-ethoxyphenyl-N'-benzoxazolyl-urea after recrystallisation from a mixture of equal parts of butanol and isopropanol. The substance melts at 186° C.

Example 18

1.5 parts of 2-amino-5-chloro-benzoxazole are dissolved in 20 parts by volume of toluene and a solution of 1.1 parts by volume of phenylisocyanate in 10 parts by volume of toluene is then added dropwise. The mixture is then heated for 2 hours to 100° C. After evaporation of the volatile compounds there remained a residue of 2.7 parts, the yield of which after recrystallisation from benzene one obtains 2.1 parts (82% of the theoretical yield) of N-phenyl N'-5-chloro-benzoxazoyl-urea melting at 205–206° C.

*Example 19*

2 parts of 2-amino-7-methyl-benzoxazole are dissolved in 20 parts by volume of toluene and 1.2 parts by volume of ethylisocyanate in 10 parts by volume of toluene are then added dropwise. The reaction mixture is then heated for 2 hours to 100° C. Then the toluene is evaporated in vacuo and the residue is recrystallized from diluted ethanol. The yield is 2.45 parts (83% of the theoretical yield) of N-ethyl-N'-7-methyl-benzoxazolyl-urea and the substance melts at 181–182° C.

What is claimed is:
1. A compound of the formula

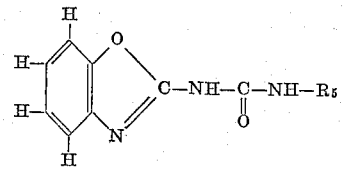

wherein $R_5$ is alkyl of 1 to 4 carbon atoms.

2. N-methyl-N'-2-benzoxazolyl-urea.
3. N-ethyl-N'-2-benzoxazolyl-urea.

References Cited by the Examiner
UNITED STATES PATENTS

| | | | |
|---|---|---|---|
| 2,073,600 | 3/37 | Bayer et al. | 260—307 |
| 2,148,920 | 2/39 | Zerweck et al. | 260—307 |
| 2,737,516 | 3/56 | Sartori | 260—307 |
| 2,756,135 | 7/56 | Searle | 71—2.5 |
| 2,776,977 | 1/57 | D'Amico | 260—307 |
| 2,780,633 | 2/57 | Sam | 260—307 |
| 2,806,853 | 9/57 | Clark et al. | 260—307 |
| 2,886,572 | 5/59 | Engelhardt | 260—307 |
| 2,895,877 | 7/59 | Marsh | 260—307 |
| 3,102,074 | 8/63 | Brown | 260—307 |

OTHER REFERENCES

Kaufmann et al.; Chem. Abstracts, vol 29, page 2660 (1935).

Lowy et al.: An Introduction to Organic Chemistry, 6th ed., 1945, page 213.

Pellizari: Chem. Abstracts, vol. 15, pages 3076–8 (1921).

Vel'tman: Chem Abstracts, vol. 52, page 20673 (1958).

IRVING MARCUS, *Primary Examiner.*

NICHOLAS S. RIZZO, WALTER A. MODANCE, *Examiners.*